United States Patent
Shinozuka

(10) Patent No.: US 12,245,298 B2
(45) Date of Patent: Mar. 4, 2025

(54) STORAGE MEDIUM AND INFORMATION PROCESSING APPARATUS

(71) Applicant: CANON KABUSHIKI KAISHA, Tokyo (JP)

(72) Inventor: Naoki Shinozuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 17/836,886

(22) Filed: Jun. 9, 2022

(65) Prior Publication Data

US 2022/0400522 A1      Dec. 15, 2022

(30) Foreign Application Priority Data

Jun. 11, 2021   (JP) .................................. 2021-097956

(51) Int. Cl.
- *H04W 76/10* (2018.01)
- *H04W 4/80* (2018.01)
- *H04W 24/08* (2009.01)

(52) U.S. Cl.
CPC ............. *H04W 76/10* (2018.02); *H04W 4/80* (2018.02); *H04W 24/08* (2013.01)

(58) Field of Classification Search
CPC ....... H04W 76/10; H04W 76/11; H04W 4/80; H04W 24/08
See application file for complete search history.

(56) References Cited

U.S. PATENT DOCUMENTS

| | | | | |
|---|---|---|---|---|
| 8,014,779 | B2 * | 9/2011 | Kanada | H04W 48/18 455/456.2 |
| 2006/0023651 | A1 * | 2/2006 | Tsuchiuchi | H04W 12/033 370/310 |
| 2007/0047480 | A1 * | 3/2007 | Suga | H04W 48/14 370/328 |
| 2016/0291851 | A1 * | 10/2016 | Tomono | H04L 43/16 |
| 2019/0335374 | A1 * | 10/2019 | Takehana | H04W 24/08 |
| 2021/0029565 | A1 * | 1/2021 | Hamabe | G01R 29/08 |

FOREIGN PATENT DOCUMENTS

JP        6641194 B2     2/2020

\* cited by examiner

*Primary Examiner* — Rasheed Gidado
(74) *Attorney, Agent, or Firm* — Canon U.S.A., Inc. IP Division

(57) ABSTRACT

A non-transitory storage medium stores a program for causing a computer of an information processing apparatus to execute acquiring information about a radio wave environment between a first external device and a communication device, determining whether to transmit information to be used in connection to the first external device to the communication device based on the information about the radio wave environment, and transmitting, in response to a determination that the information to be used in the connection to the first external device is to be transmitted to the communication device, the information to be used in the connection to the first external device to the communication device.

16 Claims, 9 Drawing Sheets

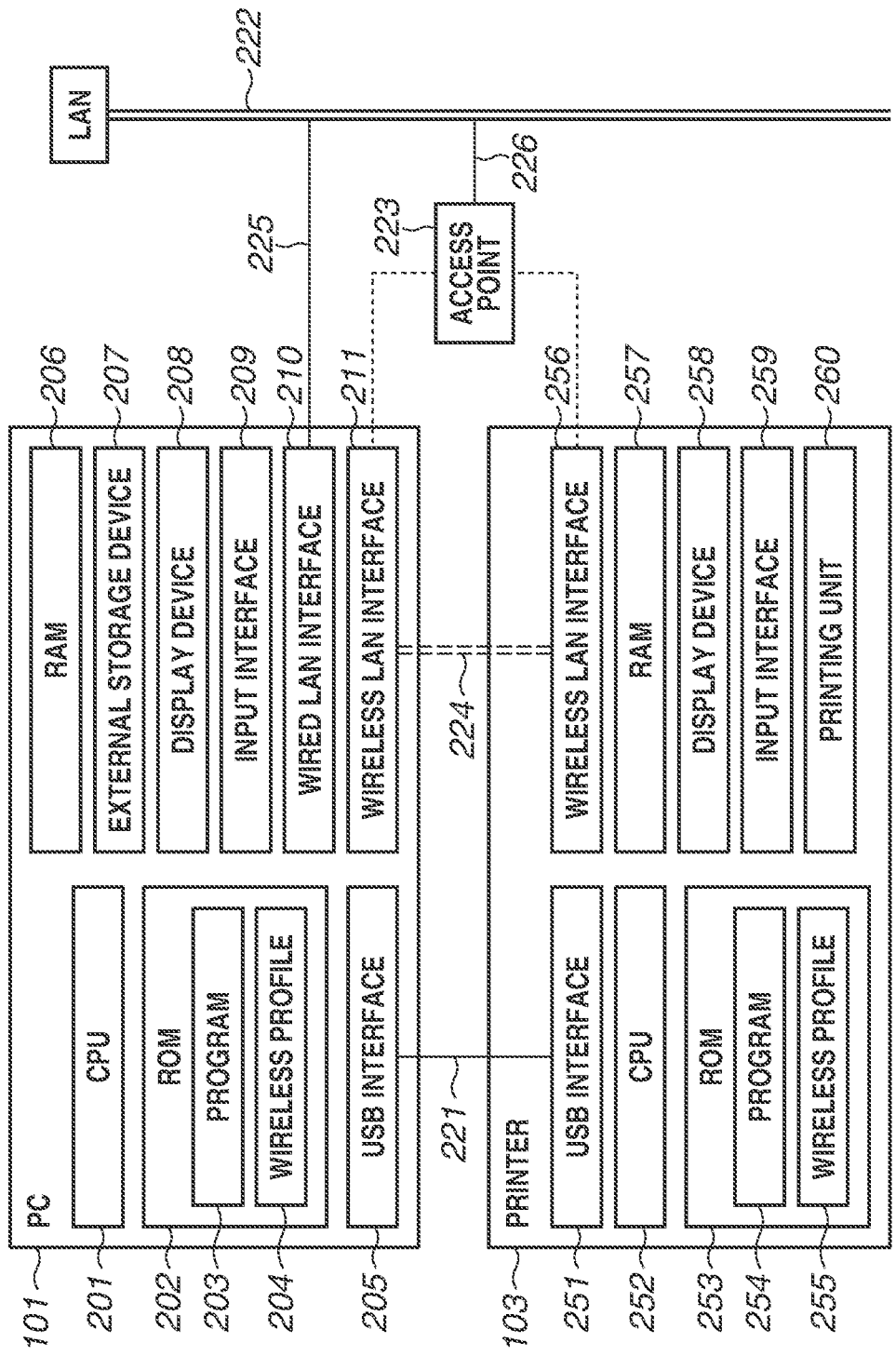

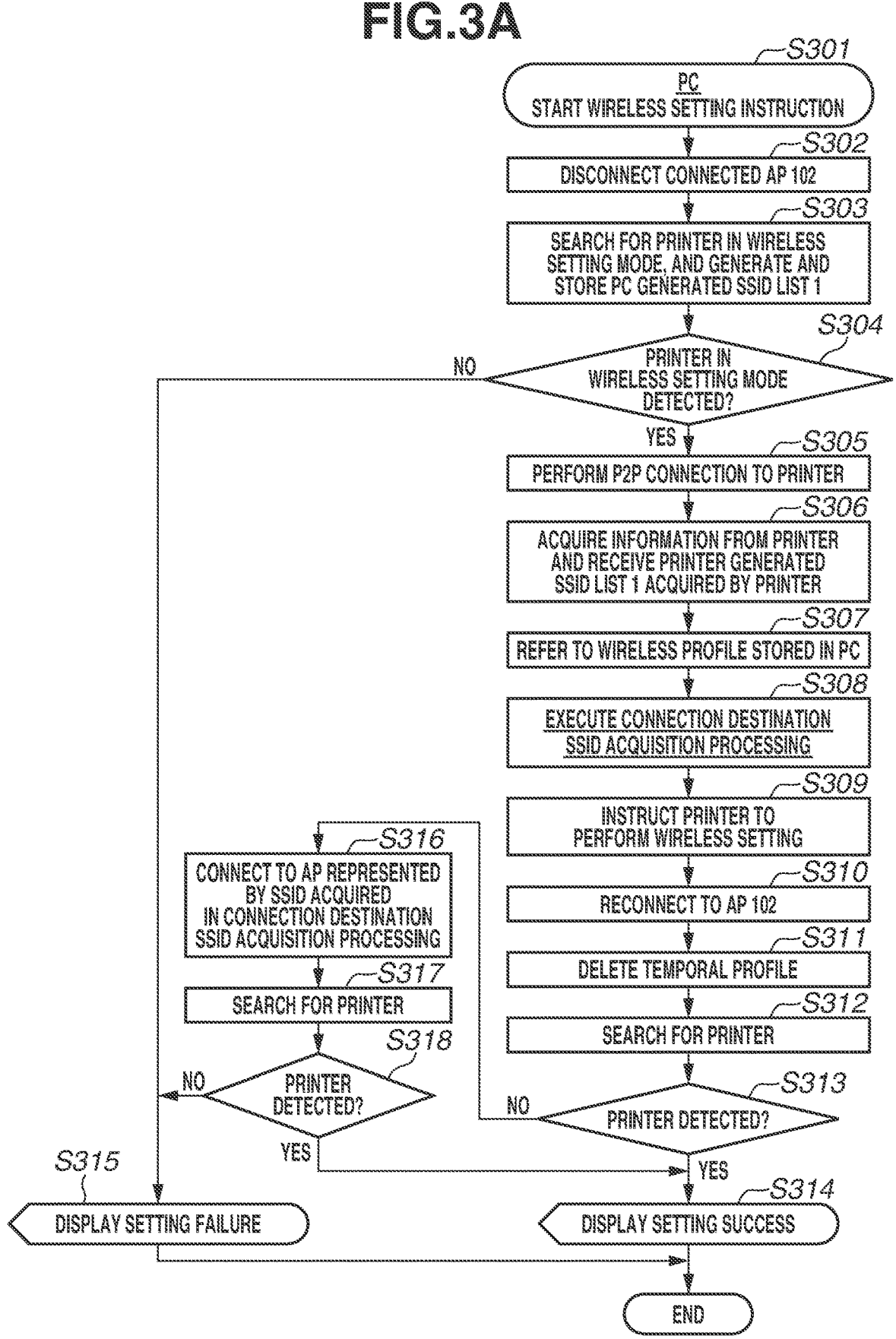

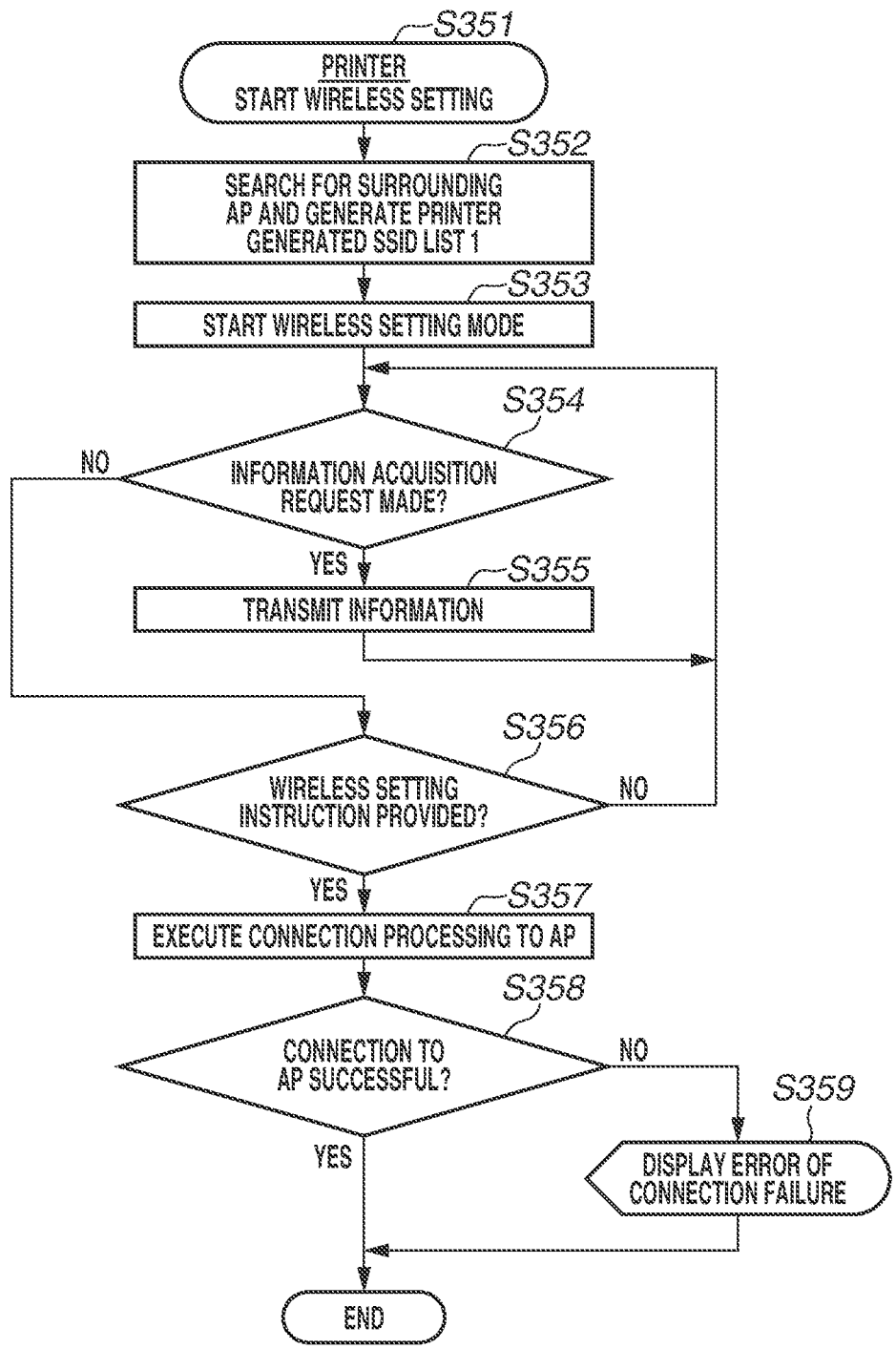

FIG.7A
PC GENERATED SSID LIST 1

| SSID DETECTED BY PC 101 | RSSI VALUE OF RADIO WAVE BETWEEN AP AND PC 101 |
|---|---|
| SSID-AAAA | 75 |
| SSID-BBBB | 70 |
| SSID-XXXX | 80 |
| SSID-ZZZZ | 55 |

FIG.7B
PRINTER GENERATED SSID LIST 1

| SSID DETECTED BY PRINTER 103 | RSSI VALUE OF RADIO WAVE BETWEEN AP AND PRINTER 103 |
|---|---|
| SSID-AAAA | 20 |
| SSID-BBBB | 65 |
| SSID-CCCC | 80 |
| SSID-XXXX | 70 |
| SSID-YYYY | 55 |
| SSID-ZZZZ | 80 |

FIG.7C
PRINTER GENERATED SSID LIST 2

| SSID OF WHICH RSSI VALUE IS GREATER THAN PREDETERMINED THRESHOLD VALUE IN PRINTER GENERATED SSID LIST 1 | RSSI VALUE OF RADIO WAVE BETWEEN AP AND PRINTER 103 |
|---|---|
| SSID-BBBB | 65 |
| SSID-CCCC | 80 |
| SSID-XXXX | 70 |
| SSID-ZZZZ | 80 |

FIG.7D
PRINTER GENERATED SSID LIST 3

| SSID STORED IN WIRELESS PROFILE INFORMATION IN PC 101 IN PRINTER GENERATED SSID LIST 2 | RSSI VALUE OF RADIO WAVE BETWEEN AP AND PRINTER 103 |
|---|---|
| SSID-XXXX | 70 |
| SSID-ZZZZ | 80 |

STORAGE MEDIUM AND INFORMATION PROCESSING APPARATUS

BACKGROUND

Field

The present disclosure relates to storage media and information processing apparatuses.

Description of the Related Art

There are known techniques for establishing a connection between a communication device and an external device (such as an access point) using an information processing device in order for the information processing apparatus and the communication device to communicate with each other. Japanese Patent No. 6641194 discusses a technique in which, in order to establish a connection between a communication device and an external device such as an access point, the communication device establishes a connection to a nearer external device depending on the distance between an information processing apparatus and the communication device.

However, for example, a method discussed in Japanese Patent No. 6641194 does not support a connection depending on the communication state between the communication device and the external device.

SUMMARY

Various embodiments of the present disclosure are directed to establishing a good connection between a communication device and an external device depending on the communication state between the communication device and the external device to provide enhanced usability.

According to one embodiment of the present disclosure, a non-transitory storage medium stores a program for causing a computer of an information processing apparatus to perform a process including acquiring information about a radio wave environment between a first external device and a communication device, determining whether to transmit information to be used in connection to the first external device to the communication device based on the information about the radio wave environment, and transmitting, in response to a determination that the information to be used in the connection to the first external device is to be transmitted to the communication device in the determining, the information to be used in the connection to the first external device to the communication device.

Further features of the present disclosure will become apparent from the following description of example embodiments with reference to the attached drawings.

BRIEF DESCRIPTION OF THE DRAWINGS

FIG. 2 illustrates a system configuration including a hardware configuration.

FIGS. 3A and 3B each are a flowchart illustrating an example of processing performed by a printer for wireless setting instructed by a personal computer (PC).

FIGS. 7A to 7D illustrate examples of SSID lists generated by the PC and the printer.

DESCRIPTION OF THE EMBODIMENTS

Figure 1A:
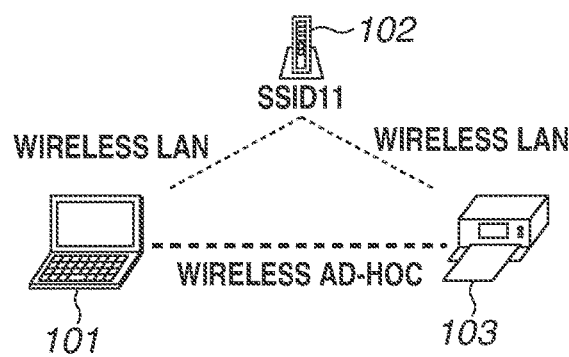
FIGS. 1A to 1D illustrate system configurations.

Some example embodiments will be described in detail below with reference to the attached drawings. The example embodiments described below do not limit the present invention according to the claims. Not all the combinations of the features described in the example embodiments are used as means for the solution in all embodiments of the present invention. The configurations the same as or similar to those in the attached drawings are denoted by the same reference numerals, and redundant descriptions will be omitted.

A first example embodiment will be described. FIGS. 1A to 1D illustrate system configurations according to the present example embodiment. FIG. 1A illustrates a state in which a personal computer (PC) 101 as an information processing apparatus and an access point (AP) 102 as an external device represented by a service set identifier (SSID) 11 as identification information are connected to each other in a wireless local area network (LAN). A printer 103 as a communication device is also connected to the AP 102 represented by the SSID 11. In other words, the PC 101 is communicable with the printer 103 via the AP 102. Such a method of connecting two devices via an AP is referred to as a wireless infrastructure connection. A wireless infrastructure connection allows construction of a network environment in which a PC can mutually communicate with two or more devices connected to an AP. As an information processing apparatus according to the present example embodiment, various devices such as a smartphone and a digital camera can be used, instead of a PC. Further, as a communication device according to the present example embodiment, various devices such as a PC, a smartphone, a digital camera, a smart speaker, and a music player can be used, instead of a printer. A printing method for the printer 103 used in the present example embodiment may be an electrophotographic method, an ink-jet method, or other methods.

On the other hand, there is a connection method called a direct connection (a peer to peer connection, hereinafter, referred to as a P2P connection) in which two devices are connected to each other without via an external device. A direct connection according to the present example embodiment may be a wireless Ad-hoc connection, a connection using a Universal Serial Bus (USB) cable 221, or a connection using legacy Wireless Fidelity (Wi-Fi) in which the printer 103 serves as a software AP. A connection by Wi-Fi Direct® may also be used.

The PC 101 performs processing for connecting the printer 103 to the AP 102 using a wireless LAN connection. Thus, the PC 101 transmits wireless network connection setting information to the printer 103 using a direct connection to cause the printer 103 to connect to the AP 102. A communication method used in a wireless LAN connection, for example, uses communication standards of Institute of Electrical and Electronics Engineers (IEEE) 802.11 series (Wi-Fi).

FIG. 2 illustrates the configuration of a communication system including the hardware configurations of the PC 101 and the printer 103 according to the present example embodiment. The PC 101 includes, for example, a central processing unit (CPU) 201, a read-only memory (ROM) 202, a random access memory (RAM) 206, an external storage device 207, a display device 208, and an input interface 209. The PC 101 further includes a USB interface 205, a wired LAN interface 210, and a wireless LAN interface 211. However, the PC 101 may include at least one of the USB interface 205, the wired LAN interface 210, and the wireless LAN interface 211. The PC 101 transmits information for connecting the printer 103 and an AP 223 described below, to the printer 103 using any of these interfaces. The wireless LAN interface 211 is an interface used for connecting to the AP 223 and the printer 103, and the communication method, for example, uses communication standards of IEEE 802.11 series (Wi-Fi). The PC 101 further includes an interface for performing communication using a wireless communication standard other than Wi-Fi and may communicate with the printer 103 using the interface. Examples of wireless communication standards other than Wi-Fi include Bluetooth® (Bluetooth® Classic, Bluetooth® Low Energy, and the like). The ROM 202 stores a program 203, a wireless profile 204 described below, and the like therein. According to the present example embodiment, the program 203 includes application programs (hereinafter, referred to as a setting application) for various types of processing including a program for wireless network setting processing for instructing a printer to perform setting of a wireless network. The above-described wireless network setting processing will be described in detail below. The external storage device 207 stores an operating system (OS), a printer driver, and other various types of data therein. The CPU 201 loads the program 203 from the ROM 202 into the RAM 206, runs it to cause the PC 101 to perform various types of processing including the above-described instruction processing. The SSID of the printer 103 operating in a wireless setting mode described below is included in the setting application, and in installation of the setting application into the PC 101, the SSID is also stored in the ROM 202. The SSID of the printer 103 operating in the wireless setting mode will be described below.

The PC 101 is directly connectable to the printer 103. The PC 101 also is connectable to a LAN 222 via an Ethernet® cable 225, and the printer 103 connected to the LAN 222 allows communication between the PC 101 and the printer 103 in the same LAN 222 environment. Further, for example, if the PC 101 is connected to the AP 223 by Wi-Fi, and the AP 223 is connected to the LAN 222 via an Ethernet® cable 226, the PC 101 also is connectable to the LAN 222. The AP 223 as an AP connected to the PC 101 is the same AP as the AP 102 in FIGS. 1A to 1D.

The wireless profile 204 is information including identification information (an SSID and the like) about the AP 223 that has been previously connected via the wireless LAN interface 211 and authentication information (a password and the like) used in authentication processing for connection with the AP 223. In other words, the wireless profile 204 includes the identification information and the authentication information about an AP to which the PC 101 is not currently connected but has been previously connected, as well as information about the AP that the PC 101 is currently connected to. The wireless LAN interface 211 is an interface used for connecting to the AP 223 and the printer 103, and the communication method, for example, uses communication standards of IEEE 802.11 series (Wi-Fi). The wireless profile 204 is stored and managed by the OS included in the external storage device 207.

The printer 103 includes a CPU 252, a ROM 253, a RAM 257, a display device 258, an input interface 259, a printing unit 260, a USB interface 251, and a wireless LAN interface 256. The wireless LAN interface 256 is an interface used for connecting to the AP 223 and the PC 101, and the communication method, for example, uses communication standards of IEEE 802.11 series (Wi-Fi). The printer 103 further includes an interface for performing communication using a wireless communication standard other than Wi-Fi and may communicate with the PC 101 using the interface. Examples of wireless communication standards other than Wi-Fi includes Bluetooth® (Bluetooth® Classic, Bluetooth® Low Energy, and the like). The ROM 253 stores a program 254, a wireless profile 255, and the like therein. The CPU 252 loads the program 254 from the ROM 253 into the RAM 257 and runs it for the printer 103 to perform various types of control. The printer 103 does not have to include the USB interface 251.

The printer 103 is directly connectable to the PC 101. Further, for example, if the printer 103 is connected to the AP 223 by Wi-Fi, and the AP 223 is connected to the LAN 222 via the Ethernet® cable 226, the printer 103 is connectable to the LAN 222.

The wireless profile 255 is information including settings of the identification information and the authentication information about the AP 223 that has been previously connected via the wireless LAN interface 256. The wireless LAN interface 256 is an interface used for connecting to the AP 223 and the PC 101, and the communication method, for example, uses communication standards of IEEE 802.11 series (Wi-Fi). The wireless profile 255 is stored and managed by the program 254 included in the ROM 253.

The ROM 253 also stores identification information (hereinafter, referred to as an SSID 13) about the printer 103 operating in the wireless setting mode stored in the ROM 202 of the above-described PC 101.

The SSID 13 is an SSID commonly used among a plurality of printers (for example, a plurality of printers of the same model or a plurality of printers provided by the same vendor). The wireless LAN interface 256 of the printer 103 can operate as an AP corresponding to the SSID 13. The P2P communication according to the present example embodiment may take a form in which either the PC 101 or the printer 103 serves as an AP. For example, in a form in which the wireless LAN interface 256 serves as an AP of the above-described printer 103 operating in the wireless setting mode, the wireless LAN interface 211 is connected thereto. Further, a form may be taken in which neither the PC 101 nor the printer 103 serves as an AP. As described above, the PC 101 is directly connectable to the printer 103 serving as an AP in the same manner as in a case of being connected to the AP 223. The configurations of the PC 101 and the printer 103 in FIG. 2 are an example and may take other forms.

According to the present example embodiment, the PC is connected to the printer, transmits information about an AP to be connected to the printer to the printer, and causes the printer to connect to the AP. For example, the PC acquires a list of APs to which the printer is connectable from the printer, determines whether an AP that has been previously connected to the PC is included in the list, and transmits information about the AP to the printer. Then, the printer is caused to be connected to the AP using the information. The information about the AP includes the identification information (the SSID and the like) about the AP and the authentication information (the password and the like) used in authentication processing of the AP.

Figure 1B:
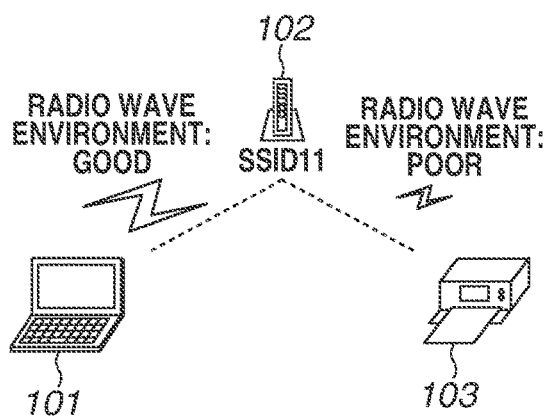

In the meantime, as illustrated in FIG. 1B, the AP transmitted from the PC to the printer may not be an appropriate AP at the position of the printer. The printer 103 in FIG. 1B is not connected to the AP 102. In other words, there is a conventional form in which a PC is connected to a printer, transmits information about an AP to be connected to the printer to the printer, and causes the printer to connect to the AP. However, this form causes the printer to establish a connection to the AP even with a poor radio wave environment between the printer and the AP corresponding to the information transmitted to the printer. That will cause unstable communication between the AP and the printer and between the PC and the printer via the AP.

For example, assuming a case in which a PC and a printer are installed at separate positions with an AP installed near the PC. The radio wave environment between the PC and the AP is good, but the radio wave environment between the printer and the AP may not be good because of a long distance between the printer and the AP.

Thus, according to the present example embodiment, the PC checks the radio wave environment between the printer and the AP before transmitting to the printer the information about the AP. Specifically, if the PC determines that the radio wave environment between the AP and the printer is good, the PC performs connection processing between the printer and the AP. Further, the PC connects to the AP in the good radio wave environment to the PC, as well as to the printer. That allows the AP and the printer to establish an optimal connection between them, reducing the possibility of causing a communication failure after setting the connection between the AP and the printer. As a result, that further reduces the possibility of causing a communication failure after setting the connection between the PC and the printer.

Figure 1C:
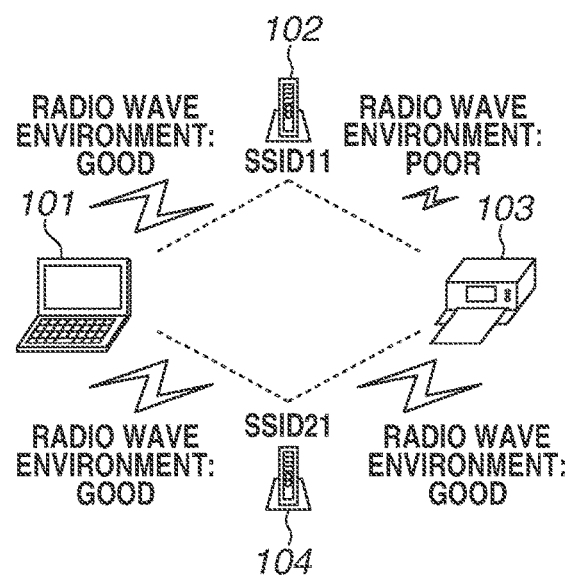

FIG. 3 illustrates processing of establishing a LAN connection between the PC 101 and the printer 103 via an AP in the good radio wave environment to the printer 103. For example, FIG. 1C illustrates a system configuration with an AP 104 in the good radio wave environment to the printer 103. In FIG. 1C, the AP 104 is also in the good radio wave environment to the PC 101. The printer 103 in FIG. 1C is not connected to the AP 102, and the PC 101 or the printer 103 is not connected to the AP 104. Processing for that condition will be described below.

Processing by the PC 101 is carried out by the CPU 201 running the setting application, and similarly, processing by the printer 103 is carried out by the CPU 252 running the program 254.

In step S301, the CPU 201 displays a predetermined screen on the display device 208 by the setting application. Then, the CPU 201 receives a specific instruction for connecting the printer to any of the APs from a user on the predetermined screen, starts processing for a wireless setting instruction, and advances the processing to step S302. The specific instruction is an instruction for connecting the printer to any of the Aps, or, an instruction for setting the PC 101 and the printer 103 in a state communicable to each other. At that time, the PC 101 is already connected to the AP 102 by Wi-Fi, and the SSID 11 and the password of the AP 102 are stored in the wireless profile 204.

In step S302, the CPU 201 disconnects the Wi-Fi connection between the PC 101 and the AP 102.

In step S303, the CPU 201 searches for the printer 103 in the wireless setting mode. This processing is performed of searching for APs around the PC 101 (AP search) and searching for an AP for the printer 103 in the wireless setting mode among the APs found. Specifically, in response to the SSID 13 that includes a predetermined character string representing the AP for the printer 103 in the wireless setting mode being found, it is determined that the AP for the printer 103 in the wireless setting mode is present. The CPU 201 also generates and stores a list of the SSIDs of the APs found in the AP search while performing the search for the printer 103 in the wireless setting mode. The list generated in step S303 is referred to as a PC generated SSID list 1 (in FIG. 7A described below).

In step S304, the CPU 201 determines whether the printer 103 in the wireless setting mode is detected (found) in the search in step S303. If YES in step S304, the CPU 201 advances the processing to step S305; otherwise (No in step S304), the CPU 201 advances the processing to step S315. The processing in step S315 will be described below.

In step S305, the CPU 201 performs processing of establishing a direct connection between the PC 101 and the printer 103. Specifically, the CPU 201 connects the wireless LAN interface 211 to the AP that is represented by the SSID 13 of the printer 103 operating in the wireless setting mode and is in the printer 103.

In step S306, the CPU 201 makes an information acquisition request to the printer 103 and receives the SSID list and the identification information (a media access control (MAC) address and the like) of the printer 103 in response from the printer 103. The SSID list acquired here is a list of the APs found by the printer 103 through the search (the AP search), and is referred to as a printer generated SSID list 1 (or a first identification information list), which will be described in detail below.

In step S307, the CPU 201 acquires the SSID 11 of the AP 102 connected at the time of starting the processing illustrated in FIG. 3, namely at the time of receiving the specific instruction in step S301 and the AP to which the wireless connection is disconnected in step S302. The SSID 11 is acquired by referring to the wireless profile 204.

In step S308, the CPU 201 performs connection destination SSID acquisition processing. The connection destination SSID acquisition processing will be described below with reference to FIG. 4.

In step S309, the CPU 201 transmits information including the AP represented by the SSID acquired in the connection destination SSID acquisition processing and the password corresponding to the SSID to the printer 103.

In step S310, the CPU 201 disconnects the direct connection between the PC 101 and the printer 103, and connects the PC 101 to the AP 102 again. Since the SSID 11 and the password of the AP 102 are stored in the wireless profile 204, in step S310, the PC 101 is reconnectable to the AP 102 without requiring the user to re-enter the password and the like.

In step S311, if information for establishing the direct connection between the PC 101 and the printer 103 exists in the wireless profile 204, the CPU 201 deletes the information in the wireless profile 204. The processing in step S311 is performed to prevent the direct connection between the PC 101 and the printer 103 from being established without a user's intention by reconnection processing performed by the PC 101.

In step S312, the CPU 201 searches for the printer 103 in a network including the AP 102.

Figure 5A:
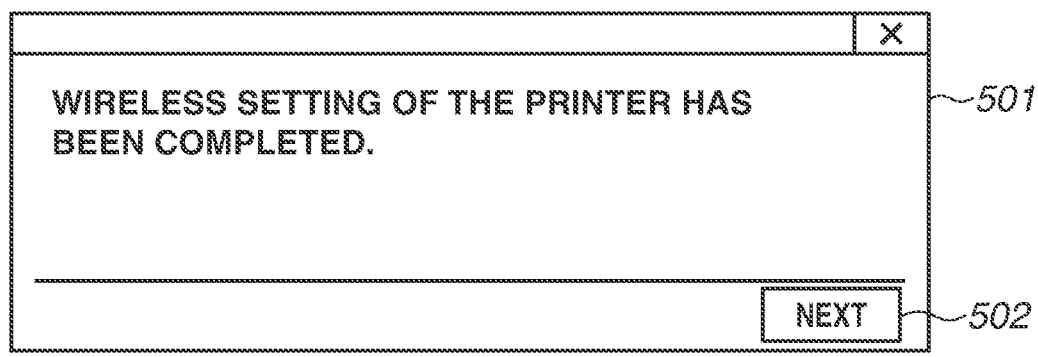
FIGS. 5A and 5B each illustrate a screen displayed on the PC in wireless setting processing.

In step S313, the CPU 201 determines whether the printer 103 is found/detected through the search in step S312. Specifically, the CPU 201 receives the identification information (the MAC address and the like) from each device connected to the AP 102. If the received identification information includes the identification information that matches the identification information acquired from the printer 103 in step S306, it is determined that the printer 103 is detected. If YES in step S313, the CPU 201 advances the processing to step S314; otherwise (NO in step S313), the CPU 201 advances the processing to step S316. If it is determined that the printer 103 is detected, in step S314, the CPU 201 displays a setting success screen 501 as illustrated in FIG. 5A on the display device 208. If the user presses a "NEXT" button 502 on the setting success screen 501, the CPU 201 terminates the wireless setting instruction processing. The CPU 201 may be connected to the printer 103 at the timing of determination that the printer 103 is detected in step S313 or at the timing of detection of the press of the "NEXT" button 502 on the setting success screen 501.

If NO in step S313, then in step S316, the CPU 201 switches the connection to the AP represented by the SSID acquired in the connection destination SSID acquisition processing. In other words, with the AP represented by the SSID acquired in the connection destination SSID acquisition processing different from the AP 102, the CPU 201 switches the connection to the AP represented by the SSID acquired in the connection destination SSID acquisition processing. For example, if the AP represented by the SSID acquired in the connection destination SSID acquisition processing is the AP 104 in an environment as illustrated in FIG. 1C, the CPU 201 switches the connection to the AP 104.

In step S317, the CPU 201 searches for the printer 103 again in the network including the AP represented by the SSID acquired in the connection destination SSID acquisition processing.

In step S318, the CPU 201 determines whether the printer 103 is found/detected through the search in step S317. The determination method is the same as that in step S313. If YES in step S318, the CPU 201 performs the processing in step S314 and terminates the wireless setting instruction processing. Otherwise (NO in step S318), the CPU 201 advances the processing to step S315.

Figure 5B:
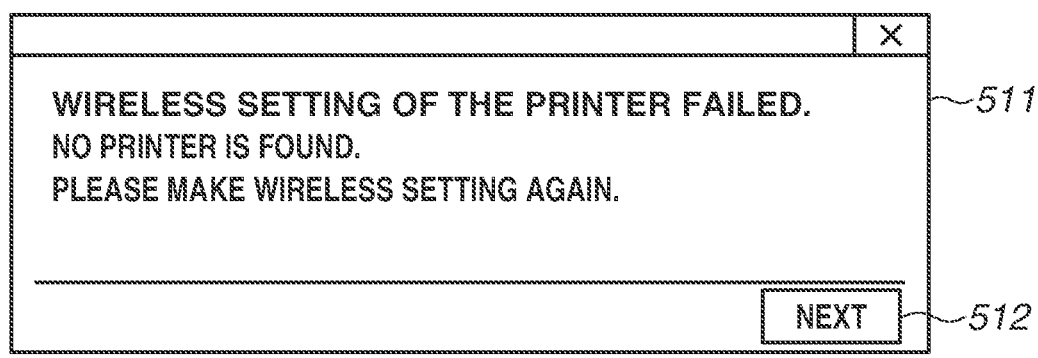

In the processing in step S315 performed in the case of NO in step S304 or in the case of NO in step S318, the CPU 201 displays a setting failure screen 511 as illustrated in FIG. 5B on the display device 208. If the user presses a "NEXT" button 512 on the setting failure screen 511, the CPU 201 terminates the wireless setting instruction processing. The case of NO in step S318 is, for example, a case (case 1) where the connection between the printer 103 and the AP represented by the SSID acquired in the connection destination SSID acquisition processing is successful, but the printer 103 cannot be detected in the network to which the PC 101 is connected. The case 1 can occur, for example, if a privacy separator is enabled in the AP.

Further, the case of NO in step S318 is, for example, a case (case 2) where an incorrect password is transmitted to the printer 103, and the connection between the printer 103 and the AP failed. Thus, for example, in step S315, the CPU 201 may receive from the printer 103 via a connection using Bluetooth® Low Energy information indicating whether the connection between the printer 103 and the AP is successful or not. Then, the case where the information indicating that the connection between the printer 103 and the AP is successful is received corresponds to the case 1. Thus, the CPU 201 may display the setting failure screen indicating that the connection between the printer 103 and the AP is successful, but the printer 103 could not be detected in the network to which the PC 101 is connected. The case where the information indicating that the connection between the printer 103 and the AP has failed is received corresponds to the case 2, and the PC 101 may display the setting failure screen indicating that the password input by the user is incorrect. If the password is incorrect, the setting failure screen indicating that the password input by the user is incorrect may be displayed before displaying the screen in FIG. 6C, which will be described below.

Next, wireless setting processing by the printer 103 will be described in detail.

In step S351, in response to a detection of a predetermined instruction to start wireless connection processing on the display device 258 of the printer 103 by the user, the CPU 252 starts the wireless connection processing.

In step S352, the CPU 252 searches for the surrounding APs (AP search) and generates the printer generated SSID list 1 including the SSID of the AP detected through the search.

In step S353, the CPU 252 shifts the printer 103 to the wireless setting mode. The printer 103 shifted to the wireless setting mode operates the wireless LAN interface 256 as an AP corresponding to the SSID of the printer 103 operating in the wireless setting mode. The shift to the wireless setting mode may be started in response to the predetermined instruction from the user or may be based on another method. For example, the method may be of being automatically shifted to the wireless setting mode at the timing of turning on the power supply in the initial start-up after purchase.

In step S354, the CPU 252 determines whether the information acquisition request is made from the PC 101 to the printer 103 shifted to the wireless setting mode. If YES in step S354, the CPU 252 advances the processing to step S355; otherwise (NO in step S354), the CPU 252 advances the processing to step S356. The processing in step S356 will be described below.

In step S355, the CPU 252 performs information transmission processing to the PC 101 and returns the processing to step S354 to wait for a next instruction. The information to be transmitted to the PC 101 includes the information about the printer generated SSID list 1 and the identification information (the MAC address and the like) about the printer 103.

In step S356 following the case of NO in step S354, the CPU 252 determines whether the wireless setting instruction is provided from the PC 101. If YES in step S356, the CPU 252 advances the processing to step S357; otherwise (NO in step S356), the CPU 252 returns the processing to step S354.

In step S357, the CPU 252 performs connection processing of connecting the printer 103 to the AP corresponding to the information received from the PC 101. Specifically, the CPU 252 performs the connection processing of connecting the AP and the printer 103 to each other using the SSID and the password corresponding to the AP included in the wireless profile 204 received from the PC 101.

In step S358, the CPU 252 determines whether the connection processing in step S357 is successful (the AP and the printer 103 are connected). If YES in step S358, the CPU 252 terminates the wireless setting processing; otherwise (NO in step S358), the CPU 252 advances the processing to step S359.

In step S359, the CPU 252 displays an error indicating that the connection processing has failed on the display device 258 of the printer 103.

Figure 4A:
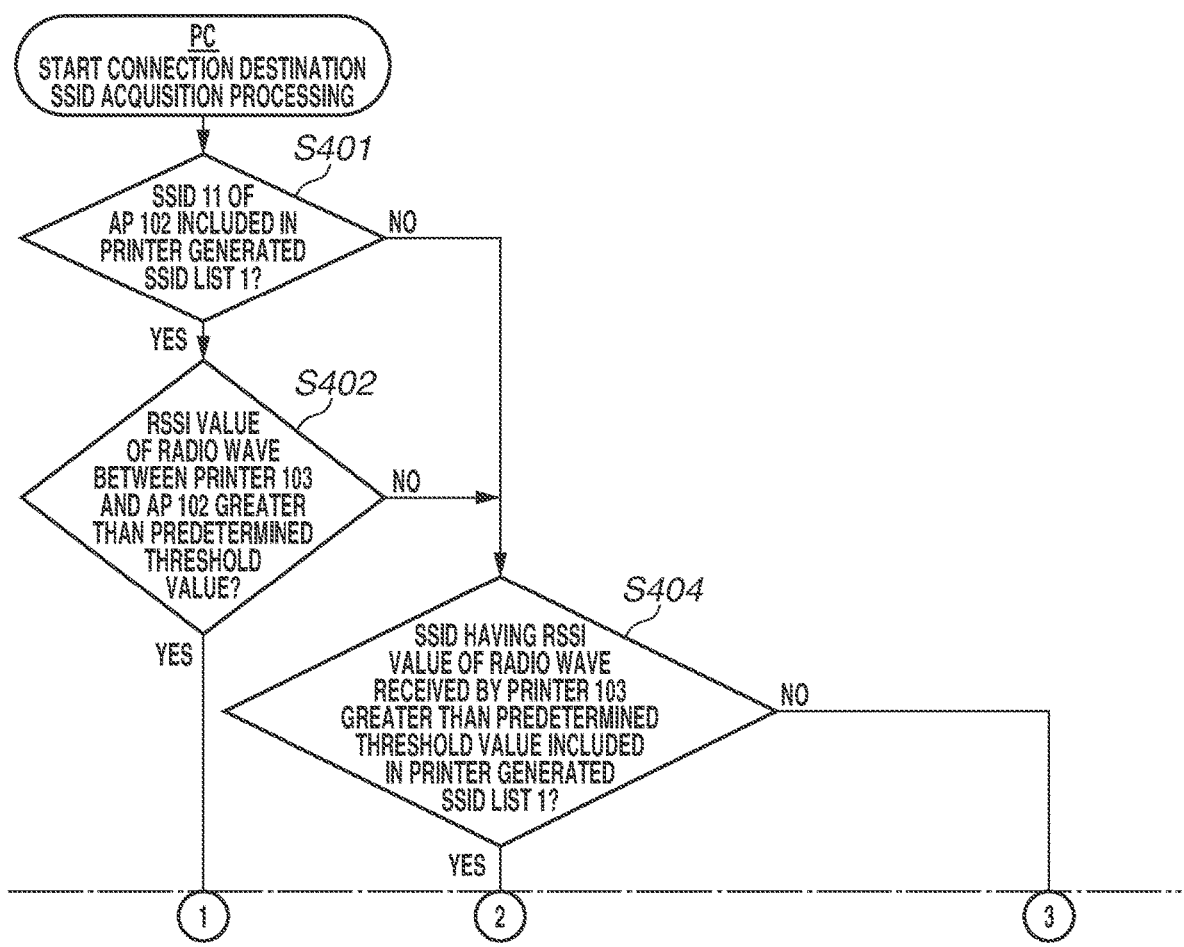
FIGS. 4A and 4B are a flowchart illustrating an example of connection destination service set identifier (SSID) acquisition processing.
Figure 4B:
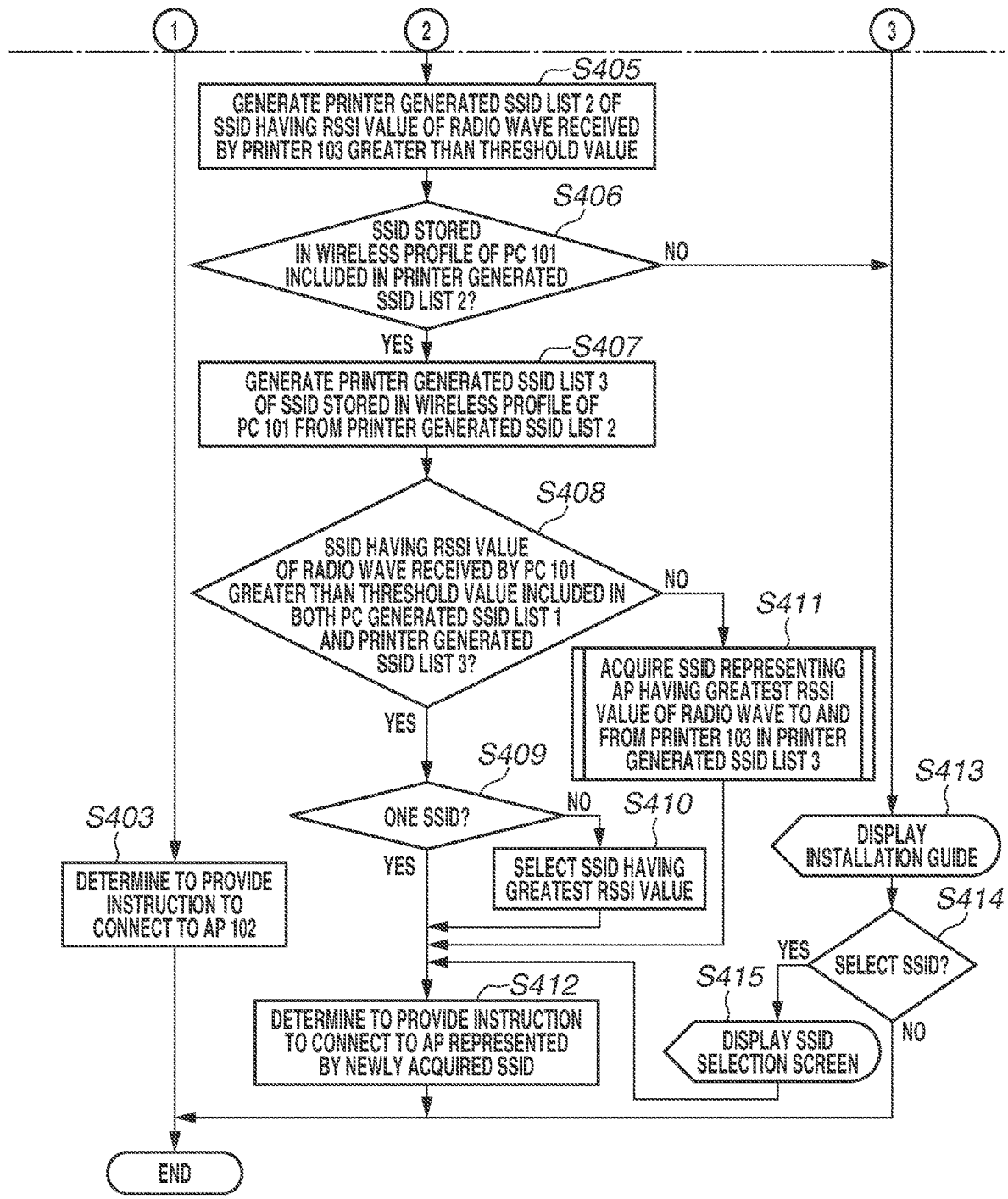

Next, the connection destination SSID acquisition processing in step S308 in FIG. 3 will be described. FIG. 4 is a flowchart illustrating the connection destination SSID acquisition processing.

In step S401, the CPU 201 determines whether the SSID 11 of the AP 102 acquired in step S307 is included in the printer generated SSID list 1 acquired from the printer 103 in step S306. The printer generated SSID list 1 may include one or a plurality of SSIDs. If YES in step S401, the CPU 201 advances the processing to step S402; otherwise (NO in step S401), the CPU 201 advances the processing to step S404. In receiving the printer generated SSID list 1 from the printer 103, the CPU 201 acquires from the printer 103 an index for determining whether the radio wave environment between the printer 103 and each AP found by the printer 103 is good. The index for determining whether the radio wave environment between the printer 103 and each AP found by the printer 103 is good is referred to as an index A below. Specifically, the CPU 252 acquires the SSID representing each AP and the index A from beacon information transmitted from each AP in searching for SSIDs of the surrounding APs in step S352. The beacon information includes information about the frequency band supported by the AP as an example. Then, in step S306, the CPU 201 acquires the index A together with the printer generated SSID list 1 from the printer 103. Similarly, the CPU 201 acquires an index for determining whether the radio wave environment between the PC 101 and the AP is good (hereinafter, referred to as an index B) when the PC 101 generates the PC generated SSID list 1 in step S303. According to the present example embodiment, the intensity of received radio wave is used as the index A and the index B. The intensity of received radio wave is for radio wave transmitted by the AP and received by the PC 101 or the printer 103. According to the present example embodiment, a received signal strength indicator (hereinafter, referred to as RSSI) is used as the intensity of received radio wave. However, the index A and the index B are not limited to the RSSI. For example, a signal to noise ratio (SNR) as a value obtained by calculating the difference between the radio wave transmitted from the AP 102 and received by the PC 101 or the printer 103 and the noise caused by radio wave with the same frequency existing in the surroundings may be used as a reference. Further, another index and a plurality of indices may be used as a reference, and a value calculated based on at least one index among a plurality of indices may be used as the reference. A timing of acquiring the printer generated SSID list 1, a timing of acquiring the index B, a timing of generating and storing the PC generated SSID list 1, and a timing of acquiring the index A by the CPU 201 may be simultaneous or different.

FIG. 7A illustrates an example of the PC generated SSID list 1. The PC generated SSID list 1 stores the SSIDs detected by the PC 101 and RSSI values as values of the index B. FIG. 7B illustrates an example of the printer generated SSID list 1. The printer generated SSID list 1 stores the SSIDs detected by the printer 103 and RSSI values as values of the index A.

In step S402, the CPU 201 determines whether the index A corresponding to the AP 102 represented by the SSID 11 is greater than a predetermined threshold value set in advance. As described above, the index A corresponding to the AP 102 is specifically the RSSI value of radio wave that is transmitted by the AP 102 and received by the printer 103. If YES in step S402, the CPU 201 advances the processing to step S403; otherwise (NO in step S402), the CPU 201 advances the processing to step S404. As the predetermined threshold value, for example, the lowest value is set of the values with which stable communication can be performed without being disconnected after the connection between the AP 102 and the printer 103 is established. Further, the predetermined threshold value for the index A and a specific threshold value for the index B, which will be described below, may be the same or different.

In step S403, the CPU 201 determines to connect the printer 103 to the AP 102 represented by the SSID 11. In other words, the processing in step S403 is an example of processing of determining whether to transmit information about the AP 102 to the printer 103. Then, the CPU 201 terminates the connection destination SSID acquisition processing and, in step S309, instructs the printer 103 to perform wireless setting for connecting to the AP 102.

In step S404 following the case of NO in step S401 or the case of NO in step S402, the CPU 201 determines whether the SSID corresponding to the index A greater than the predetermined threshold value is included in the printer generated SSID list 1. If YES in step S404, the CPU 201 advances the processing to step S405; otherwise (NO in step S404), the CPU 201 advances the processing to step S413. The processing in step S413 will be described below.

In step S405, the CPU 201 generates an SSID list including only the SSIDs corresponding to the index A greater than the predetermined threshold value from among the SSIDs included in the printer generated SSID list 1. According to the present example embodiment, the list generated in step S405 is referred to as a printer generated SSID list 2. FIG. 7C illustrates an example of the printer generated SSID list 2 with the predetermined threshold value tentatively set to 60.

In step S406, the CPU 201 determines whether the SSID stored in the wireless profile 204 of the PC 101 is included in the printer generated SSID list 2. If the SSID is stored in the wireless profile 204 of the PC 101, the PC 101 has connected to the AP represented by the SSID before the connection with the AP 102. In other words, the CPU 201 determines whether the SSID corresponding to the AP to which the PC 101 has previously connected is included in the printer generated SSID list 2. If the SSID is stored in the wireless profile 204 of the PC 101, the connection to the AP can be established without requiring the user to input the authentication information and the like. If YES in step S406, the CPU 201 advances the processing to step S407; otherwise (NO in step S406), the CPU 201 advances the processing to step S413. The processing in step S413 will be described below.

In step S407, the CPU 201 generates an SSID list including only the SSIDs stored in the wireless profile 204 of the PC 101 from among the SSIDs included in the printer generated SSID list 2. According to the present example embodiment, the list generated in step S407 is referred to as a printer generated SSID list 3. FIG. 7D illustrates an example of the printer generated SSID list 3 for wireless profiles regarding SSID-XXXX and SSID-ZZZZ stored in the PC 101.

In step S408, the CPU 201 determines whether the SSID corresponding to the index B greater than the specific threshold value is included in the SSIDs that are included in both the PC generated SSID list 1 and the printer generated SSID list 3. As described above, the index B is the index for determining whether the radio wave environment between the PC 101 and the AP is good. A reason for referring to both the PC generated SSID list 1 and the printer generated SSID list 3 will be described. This is because the AP represented by the SSID that corresponds to the index A greater than the predetermined threshold value and is stored in the wireless profile 204 of the PC 101 among the SSIDs found by the printer 103 is the AP represented by the SSID found by the PC 101. Then, the determination whether the index B corresponding to the AP represented by the SSID is greater than the specific threshold value allows determination both whether the index A is greater than the predetermined threshold value and whether the index B is greater than the specific threshold value. In other words, that allows determination whether both the radio wave environment between the printer 103 and the AP and the radio wave environment between the PC 101 and the AP are good. If YES in step S408, the CPU 201 advances the processing to step S409; otherwise (NO in step S408), the CPU 201 advances the processing to step S411. Step S411 will be described below.

In step S409, the CPU 201 determines whether one SSID corresponds to the index B greater than the specific threshold value out of the SSIDs included in both the PC generated SSID list 1 and the printer generated SSID list 3. If YES in step S409, the CPU 201 selects the SSID and advances the processing to step S412; otherwise (NO in step S409), the CPU 201 advances the processing to step S410. Step S412 will be described below.

In step S410, the CPU 201 selects the SSID corresponding to the maximum index A greater than the predetermined threshold value among the SSIDs included in both the PC generated SSID list 1 and the printer generated SSID list 3. According to the present example embodiment, the SSID having the maximum value of the index A is selected, but the present invention is not limited to this form. For example, the SSID corresponding to a maximum index B greater than the specific threshold value may be selected. Further, another form may be taken.

Figure 1D:
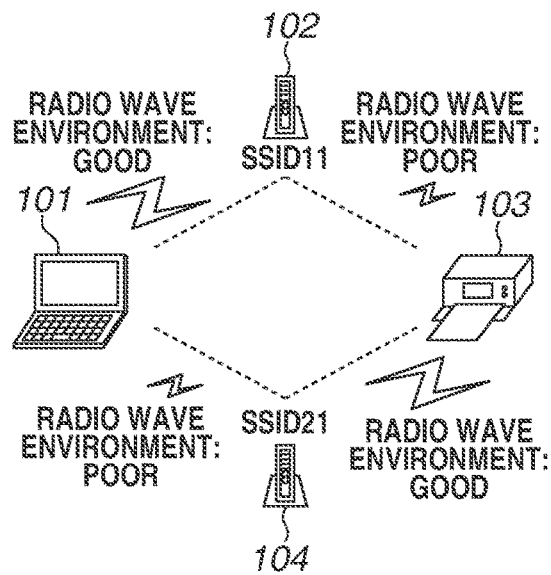

In step S411 following the case of NO in step S408, the CPU 201 acquires (selects) the SSID having the maximum value of the index A among the SSIDs included in the printer generated SSID list 3. The case of NO in step S408 is, for example, a case of an environment as illustrated in FIG. 1D. In other words, in that case, the radio wave environment between the printer 103 and the AP 104 is good, but the radio wave environment between the PC 101 and the AP 104 is not good. In that case, the CPU 201 selects the SSID representing the AP of which the radio wave environment between the printer 103 and the AP is good.

In that case, the PC 101 is reconnected to the AP 102 in step S310 in FIG. 3, searches for the printer 103 in step S312, and determines whether the printer 103 is detected in step S313. If it is determined that the printer 103 is detected in step S313, the PC 101 has detected the printer 103 connected to the AP represented by the SSID selected in the connection destination SSID acquisition processing with the PC 101 connected to the AP 102. It can be considered that the AP represented by the SSID selected in the connection destination SSID acquisition processing is the AP connectable to the AP 102. It can be also considered that the AP represented by the SSID selected in the connection destination SSID acquisition processing is the AP 102, but the AP 102 supports an SSID in a different frequency band, and the SSIDs that the PC 101 and the printer 103 are respectively connected to are different. In step S313, if it is determined that the printer 103 is not detected (NO in step S313), the following form may be taken before the PC 101 is connected to the AP represented by the SSID acquired in the connection destination SSID acquisition processing in step S316. The SSID having the maximum value of the index A is acquired (selected) from the APs represented by the SSIDs remaining after excluding the SSID already selected in the connection destination SSID acquisition processing from the SSIDs included in the printer generated SSID list 3. Then, the CPU 201 determines to provide an instruction to connect the AP represented by the acquired SSID and the printer 103 and performs processing similar to that in steps S309 to S313 (hereinafter, referred to as a verification 1). The CPU 201 sequentially performs the verification 1 on the SSIDs included in the printer generated SSID list 3 until the printer 103 is detected in processing similar to that in step S313 (YES in step S313). Further, if it is determined that the printer 103 is not detected in processing similar to that in step S313 (NO in step S313) as a result of the verification 1, the CPU 201 may advance the processing to step S316 or take the following form. The CPU 201 performs processing in steps S413 to S415 described below, determines to provide the instruction to connect the AP represented by the SSID selected by the user and the printer 103, and performs processing similar to that in steps S309 to S313 (hereinafter, referred to as a verification 2).

Then, if it is determined that the printer 103 is not detected in processing similar to that in step S313 (NO in step S313) as a result of the verification 2, in step S316, the PC 101 may be connected to the AP represented by the SSID acquired in the connection destination SSID acquisition processing. In FIG. 1D, the printer 103 is not connected to the AP 102, and the PC 101 or the printer 103 is not connected to the AP 104.

Figure 6A:
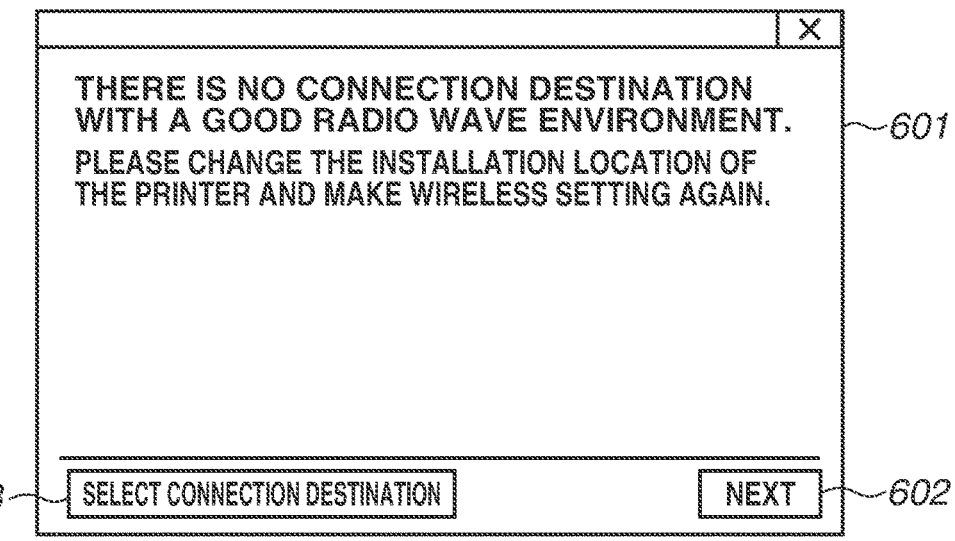
FIGS. 6A to 6C each illustrate a screen displayed on the PC in the connection destination SSID acquisition processing.

In step S413 following the case of NO in step S404 or the case of NO in step S406, the CPU 201 determines that there is no SSID suitable for establishing the LAN connection with the printer 103. In that case, the CPU 201 displays on the display device 208 an installation guide screen 601 as illustrated in FIG. 6A for prompting the user to change the installation location of the printer 103. The installation guide screen 601 displays a guide for prompting the user to change the installation location of the printer 103, but the present invention is not limited to this form. For example, a form for prompting a user to change the installation location of the AP 102 or the PC 101, or both may be taken.

In step S414, the CPU 201 determines whether to newly select the connection destination SSID. Specifically, in response to a press of a "select connection destination" button 603 on the installation guide screen 601 by the user, illustrated in FIG. 6A, the CPU 201 determines to select the connection destination SSID. On the other hand, in response to a press of a "NEXT" button 602 on the installation guide screen 601 by the user, illustrated in FIG. 6A, the CPU 201 determines to terminate the connection destination SSID acquisition processing. If YES in step S414, the CPU 201 advances the processing to step S415; otherwise (NO in step S414), the CPU 201 terminates the connection destination SSID acquisition processing. When the connection destination SSID acquisition processing is terminated, the CPU 201 does not provide an instruction of an AP connection to the printer 103 in step S309. In that case, the above-described setting failure screen 511 as illustrated in FIG. 5B may be displayed. Then, the CPU 201 may terminate the wireless setting instruction processing in response to a press of the "NEXT" button 512 on the setting failure screen 511 by the user.

Figure 6B:
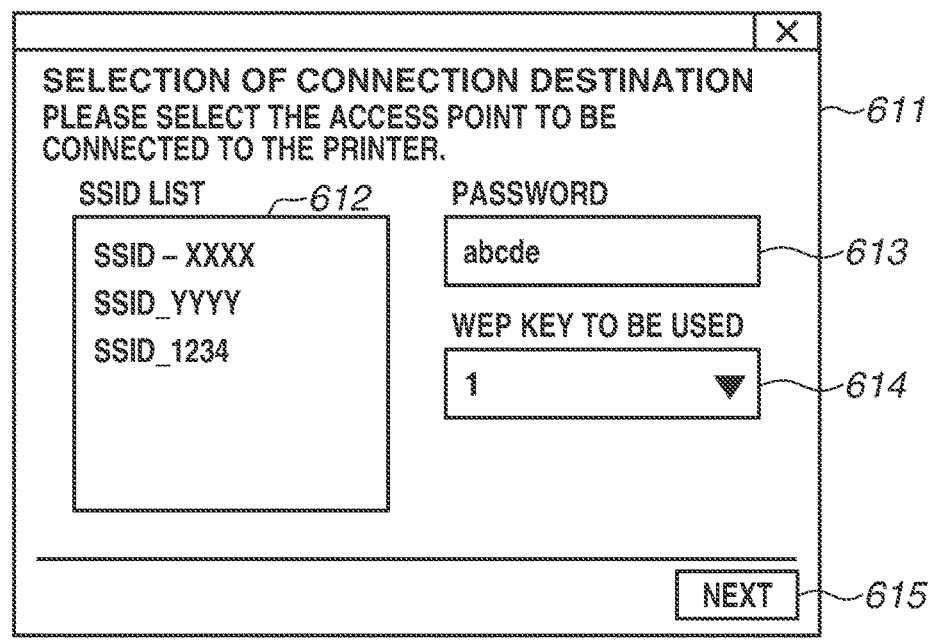

In step S415, the CPU 201 displays a connection destination selection screen 611 as illustrated in FIG. 6B. The connection destination selection screen 611 includes an SSID list 612, a password setting portion 613, a Wired Equivalent Privacy (WEP) key selection portion 614, and a "NEXT" button 615. In the SSID list 612, the SSIDs included in the printer generated SSID list 1 acquired by the PC 101 in step S306 are displayed in a list. The user selects a desired SSID from the SSID list 612 and inputs a password (for example, characters or numerals) set for the selected SSID in the password setting portion 613. The CPU 201 acquires an encryption method and channel (frequency band) information about each SSID from the printer 103 similar to the acquisition of the RSSI as the above-described index A in acquiring the printer generated SSID list 1 in step S306. If the communication performed via the SSID selected from the SSID list 612 is encrypted with the WEP, the CPU 201 enables the WEP key selection portion 614 and causes the user to select the WEP key. Subsequently, in response to a press of the "NEXT" button 615 by the user, the CPU 201 closes the connection destination selection screen 611. Then, in step S414, the CPU 201 determines to connect the printer 103 to the AP represented by the SSID selected by the user from the SSID list 612. The RSSI as the corresponding index A can be displayed in the SSID list 612 in addition to the name of each SSID. In that case, the user can select the SSID while comparing the RSSI of each SSID.

In step S412, the CPU 201 determines to connect the printer 103 to the AP represented by the SSID selected (acquired) in each processing. In other words, the processing in step S412 is an example of processing of determining whether to transmit the information about the AP to the printer 103. Then, in step S309, the CPU 201 provides the instruction of the AP connection to the printer 103.

Figure 6C:
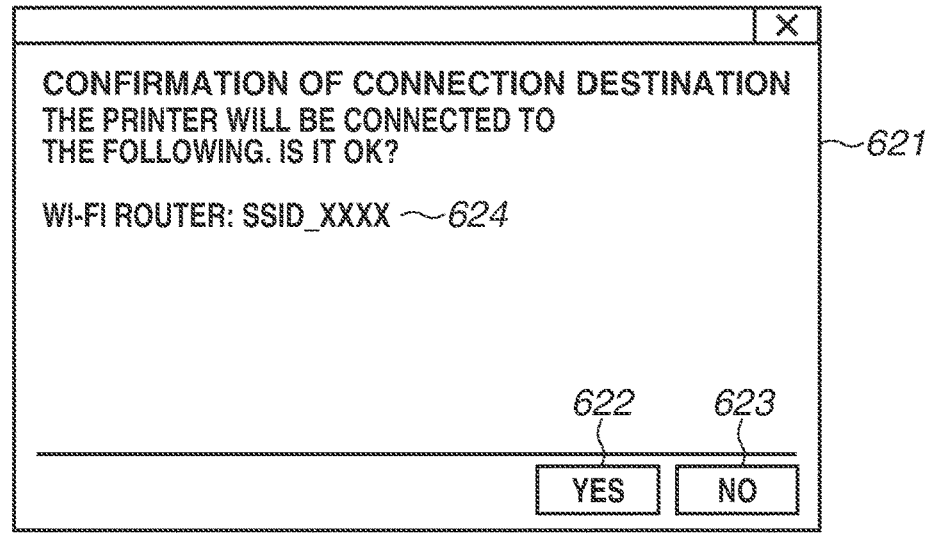

According to the present example embodiment, in steps S403 and S412, the CPU 201 determines to connect the printer 103 to the AP represented by the SSID selected in each processing, but a form may be taken for asking a user to confirm before the determination. In that case, for example, the CPU 201 displays a connection destination confirmation screen 621 as illustrated in FIG. 6C on the display device 208. Then, if the user presses a "YES" button 622, the CPU 201 determines to connect the printer 103 to the AP represented by the SSID selected in each processing.

In FIG. 6C, an SSID 624 representing the AP to which the printer 103 is to be connected is displayed as an item displayed, but the item displayed is not limited to that form. For example, other information (the MAC address and the like) representing the AP may be included. If the user presses a "NO" button 623, the CPU 201 may take a form for terminating the connection destination SSID acquisition processing or a form for displaying the above-described connection destination selection screen 611.

When the connection destination SSID acquisition processing is terminated, the above-described setting failure screen 511 as illustrated in FIG. 5B may be displayed. Then, the CPU 201 may terminate the wireless setting instruction processing in response to a press of the "NEXT" button 512 on the setting failure screen 511 by the user.

According to the above-described processing, the PC 101 can acquire an SSID 21 of the AP 104 in the environment as illustrated in FIG. 1C in which the AP 104 having the good radio wave environment to both the PC 101 and the printer 103 exists.

In advancing the processing to step S404 in FIG. 4, the CPU 201 may take a form for performing the subsequent processing in order from arbitrary SSID included in the printer generated SSID list 1.

Further, the CPU 201 first determines whether the SSID 11 of the AP 102 to which the PC 101 has been previously connected is included in the printer generated SSID list 1 acquired from the printer in the connection destination SSID acquisition processing, but the present invention is not limited to that form. For example, the processing may be started in step S404 in FIG. 4. In other words, the CPU 201 may be in a form for first determining whether the value of the index A is greater than the predetermined threshold value in the SSIDs included in the printer generated SSID list 1 acquired from the printer and then performing the subsequent processing. In this case, the processing in step S302 in FIG. 3 is not performed, and the processing in step S316 is performed in step S310.

As described above, according to the present example embodiment, in response to it being determined that the radio wave environment between the AP and the printer is good, connection processing between the printer and the AP is performed. Further, the PC and the printer are both connected to the AP in the good radio wave environment. Thus, if an AP is not appropriate for the printer, that configuration reduces the situation where a connection with the AP is established. As a result, that configuration further reduces the possibility of causing a communication failure after setting a connection between the PC and the printer.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-097956, filed Jun. 11, 2021, which is hereby incorporated by reference herein in its entirety.

What is claimed is:

1. A non-transitory storage medium storing a program for causing a computer of an information processing apparatus to perform a process comprising:

acquiring information, in a first acquiring, about a radio wave environment between a first external device and a communication device;

acquiring, in a second acquiring, a first identification information list that is a list including one or a plurality of pieces of identification information representing an external device found by the communication device;

determining, in a first determining, whether a value corresponding to the information about the radio wave environment is greater than a threshold value;

determining whether to transmit information to be used in connection to the first external device to the communication device based on the information about the radio wave environment; and transmitting, in a first transmitting, in response to a determination that the information to be used in the connection to the first external device is to be transmitted to the communication device in the determining, the information to be used in the connection to the first external device to the communication device, wherein, in response to a determination that the value corresponding to the information about the radio wave environment is greater than the threshold value in the first determining, the determining determines to transmit the information to be used in the connection to the first external device to the communication device;

wherein the first external device is an external device that corresponds to the one or any of the plurality of pieces of identification information included in the first identification information list acquired in the second acquiring;

wherein the program further causes the computer to execute:

the first determining based on the information about the radio wave environment between the first external device and the communication device, the first external device being an external device to which the information processing apparatus has been previously connected, the external device to which the information processing apparatus has been previously connected being an external device corresponding to the one or any of the plurality of pieces of identification information included in the first identification information list, and the first determining based on the information about the radio wave environment between the communication device and the first external device corresponding to the one or any of the plurality of pieces of identification information included in the first identification information list and the information about the radio wave environment between the first external device and the information processing apparatus in response to the external device to which the information processing apparatus has been previously connected not being an external device corresponding to the one or any of the plurality of pieces of identification information included in the first identification information list.

2. The non-transitory storage medium according to claim 1, wherein the process further comprises acquiring, in a third acquiring, information about a radio wave environment between the communication device and one or a plurality of second external devices represented by one or a plurality of pieces of identification information different from the identification information representing the first external device included in the first identification information list.

3. The non-transitory storage medium according to claim 2, wherein the process further comprises:

determining, in a second determining, in response to a determination that the value corresponding to the information about the radio wave environment between the first external device and the communication device acquired in the first acquiring is less than the threshold value in the first determining, whether the one or the plurality of second external devices corresponding to a value that corresponds to the information about the radio wave environment between the communication device and the one or the plurality of second external devices, exists, the information about the radio wave environment between the communication device and the one or the plurality of second external devices being acquired in the third acquiring, and the value that corresponds to the information about the radio wave environment between the communication device and the one or the plurality of second external devices being greater than the threshold value;

determining, in a third determining, in response to a determination that the one or the plurality of second external devices corresponding to the value corresponding to the information about the radio wave environment between the communication device and the one or the plurality of second external devices greater than the threshold value exists in the second determining, whether the one or the plurality of second external devices corresponding to a value that corresponds to information about a radio wave environment between the one or the plurality of second external devices and the information processing apparatus, exists, the value that corresponds to the information about the radio wave environment between the one or the plurality of second devices and the information processing apparatus being greater than a specific threshold value; and transmitting, in a second transmitting, in response to a determination that the one or the plurality of second external devices corresponding to the value that corresponds to the information about the radio wave environment between the one or the plurality of second external devices and the information processing apparatus exists in the third determining, the value that corresponds to the information about the radio wave environment between the one or the plurality of second external devices and the information processing apparatus being greater than the specific threshold value, information used in connection to the one second external device corresponding to the value that corresponds to the information about the radio wave environment between the one or the plurality of second external devices and the information processing apparatus, to the communication device, the value that corresponds to the information about the radio eave environment between the one or the plurality of second external devices and the information processing apparatus being greater than the specific threshold value.

4. The non-transitory storage medium according to claim 3, wherein the process further comprises:

determining, in a fourth determining, in response to a determination that the one or the plurality of second external devices corresponding to the value that corresponds to the information about the radio wave environment between the one or the plurality of second external devices and the communication device exists in the second determining, the value that corresponds to the information about the radio wave environment between the one or the plurality of second external devices and the communication device being greater than the threshold, whether the one or the plurality of second external devices corresponding to the value that corresponds to the information about the radio wave environment between the one or the plurality of second external devices and the communication device is an external device to which the information processing apparatus has been previously connected, the value that corresponds to the information about the radio wave environment between the one or the plurality of second external devices and the communication device being greater than the threshold value; and the third determining in response to a determination that the one or the plurality of second external devices corresponding to the value that corresponds to the information about the radio wave environment between the one or the plurality of second external devices and the communication device is the external device to which the information processing apparatus has been previously connected in the fourth determining, the value that corresponds the information about the radio wave environment between the one or the plurality of second devices and the communication device being greater than the threshold value, and wherein, in response to a determination that the one or the plurality of second external devices corresponding to the value that corresponds to the information about the radio wave environment between the one or the plurality of second external devices and the information processing apparatus exists in the third determining, the value that corresponds to the information about the radio wave environment between the one or the plurality of second external devices and the information processing apparatus being greater than the specific threshold value, the information used in the connection to the one second external device corresponding to the value that corresponds to the information about the radio wave environment between the one or the plurality of second external devices and the information processing apparatus is transmitted to the communication device in the second transmitting, the value that corresponds the information about the radio wave environment between the one or the plurality of second external devices and the information processing apparatus being greater than the specific threshold value.

5. The non-transitory storage medium according to claim 4, wherein the process further comprises displaying a guide for changing a position of the communication device in response to a determination that none of the one or the plurality of second external devices corresponding to the value that corresponds to the information about the radio wave environment between the one or the plurality of second external devices and the communication device exists in the second determining, or in response to a determination that the one or the plurality of second external devices corresponding to the value that corresponds to the information about the radio wave environment between the one or plurality of second external devices and the communication device is not the external device to which the information processing apparatus has been previously connected in the fourth determining, the value that corresponds the information about the radio wave environment between the one or the plurality of second devices and the communication device being greater than the threshold value.

6. The non-transitory storage medium according to claim 3, wherein the process further comprises transmitting, in a third transmitting, in response to a determination that the plurality of second external devices corresponding to the value that corresponds to the information about the radio wave environment between the one or the plurality of second external devices and the information processing apparatus greater than the specific threshold value exists in the third determining, the value that corresponds to the information about the radio wave environment between the one or the plurality of second external devices and the information processing apparatus being greater than the specific threshold value, information used in connection between the communication device and the one second external device corresponding to a maximum value that corresponds to the information about the radio wave environment between the plurality of second external devices and the information processing apparatus, to the communication device.

7. The non-transitory storage medium according to claim 3, wherein the process further comprises transmitting, in a fourth transmitting, in response to a determination that none of the one or the plurality of second external devices corresponding to the value that corresponds to the information about the radio wave environment between the one or the plurality of second external devices and the information processing apparatus, the value being greater than the specific threshold value, exists in the third determining, information used in connection to the one second external device corresponding to a maximum value that corresponds to the information about the radio wave environment between the one or the plurality of second external devices and the communication device, the information being acquired in the third acquiring, to the communication device.

8. The non-transitory storage medium according to claim 3, wherein the specific threshold value is the same value as or a different value from the threshold value in the program.

9. The non-transitory storage medium according to claim 1,
wherein the process further comprises receiving a predetermined instruction for performing wireless setting on the communication device,
wherein, in response to the predetermined instruction being received in the receiving, the information to be used in the connection to the first external device is transmitted to the communication device, and
wherein the first external device is an external device to which the information processing apparatus is connected at least at a time of receiving the predetermined instruction.

10. The non-transitory storage medium according to claim 1,
wherein the process further comprises receiving a predetermined instruction for performing wireless setting on the communication device,
wherein, in response to the predetermined instruction being received in the receiving, the information to be used in the connection to the first external device is transmitted to the communication device, and
wherein the first external device is an external device corresponding to the one or any of the plurality of pieces of identification information included in the first identification information list and to which the information processing apparatus is connected at a time of receiving the predetermined instruction.

11. The non-transitory storage medium according to claim 1, wherein, in response to the information to be used in the connection to the first external device being transmitted to the communication device in connection using Bluetooth®, the program transmits the information to be used in the connection to the first external device to the communication device in the connection using Bluetooth® without disconnecting connection between the information processing apparatus and the first external device.

12. The non-transitory storage medium according to claim 1, wherein, in response to the information to be used in the connection to the first external device being transmitted to the communication device in connection using Wireless Fidelity (Wi-Fi), the program transmits the information to be used in the connection to the first external device to the communication device in the connection using Wi-Fi by disconnecting the connection using Wi-Fi between the information processing apparatus and the first external device.

13. The non-transitory storage medium according to claim 1, wherein the information about the radio wave environment is an intensity of a received radio wave.

14. The non-transitory storage medium according to claim 1, wherein the information about the radio wave environment is a signal to noise ratio of a radio wave.

15. An information processing apparatus comprising:
an acquisition unit configured to acquire information about a radio wave environment between a first external device and a communication device, acquiring a first identification information list that is a list including one or a plurality of pieces of identification information representing an external device found by the communication device;
a determination unit configured to determine whether a value corresponding to the information about the radio wave environment is greater than a threshold value and determining whether to transmit information to be used in connection to the first external device based on the information about the radio wave environment; and
a first transmission unit configured to, in response to a determination by the determination unit that the information to be used in the connection to the first external device is to be transmitted to the communication device, transmit the information to be used in the connection to the first external device to the communication device,
wherein, in response to a determination that the value corresponding to the information about the radio wave environment is greater than the threshold value, it is determined to transmit the information to be used in the connection to the first external device to the communication device;
wherein the first external device is an external device that corresponds to the one or any of the plurality of pieces of identification information included in the first identification information list acquired;
wherein the program further causes the computer to execute:
determining based on the information about the radio wave environment between the first external device and the communication device, the first external device being an external device to which the information processing apparatus has been previously connected, the external device to which the information processing apparatus has been previously connected being an external device corresponding to the one or any of the plurality of pieces of identification information included in the first identification information list, and
determining based on the information about the radio wave environment between the communication device and the first external device corresponding to the one or any of the plurality of pieces of identification information included in the first identification information list and the information about the radio wave environment between the first external device and the information processing apparatus in response to the external device to which the information processing apparatus has been previously connected not being an external device corresponding to the one or any of the plurality of pieces of identification information included in the first identification information list.

16. An information processing method comprising:
acquiring information, in a first acquiring, about a radio wave environment between a first external device and a communication device;
acquiring, in a second acquiring, a first identification information list that is a list including one or a plurality of pieces of identification information representing an external device found by the communication device;
determining, in a first determining, whether a value corresponding to the information about the radio wave environment is greater than a threshold value;
determining whether to transmit information to be used in connection to the first external device to the communication device based on the information about the radio wave environment; and
transmitting, in a first transmitting, in response to a determination that the information to be used in the connection to the first external device is to be transmitted to the communication device in the determining, the information to be used in the connection to the first external device to the communication device,
wherein, in response to a determination that the value corresponding to the information about the radio wave environment is greater than the threshold value in the first determining, the determining determines to transmit the information to be used in the connection to the first external device to the communication device;
wherein the first external device is an external device that corresponds to the one or any of the plurality of pieces of identification information included in the first identification information list acquired in the second acquiring; wherein the program further causes the computer to execute:
the first determining based on the information about the radio wave environment between the first external device and the communication device, the first external device being an external device to which the information processing apparatus has been previously connected, the external device to which the information processing apparatus has been previously connected being an external device corresponding to the one or any of the plurality of pieces of identification information included in the first identification information list, and
the first determining based on the information about the radio wave environment between the communication device and the first external device corresponding to the one or any of the plurality of pieces of identification information included in the first identification information list and the information about the radio wave environment between the first external device and the information processing apparatus in response to the external device to which the information processing apparatus has been previously connected not being an external device corresponding to the one or any of the plurality of pieces of identification information included in the first identification information list.

* * * * *